METHOD OF FORMING A SILICON NITRIDE COATING

Filed May 3, 1965

INVENTORS
HENLEY F. STERLING
RICHARD C. G. SWANN
BY Philip M. Bolton
ATTORNEY

United States Patent Office 3,485,666
Patented Dec. 23, 1969

3,485,666
METHOD OF FORMING A SILICON NITRIDE COATING

Henley Frank Sterling and Richard Charles George Swann, London, England, assignors to International Standard Electric Corporation, New York, N.Y., a corporation of Delaware Filed May 3, 1965, Ser. No. 452,487
Claims priority, application Great Britain, May 8, 1964, 19,219/64
Int. Cl. B44d 1/34, 1/02
U.S. Cl. 117—230 7 Claims

ABSTRACT OF THE DISCLOSURE

This is a method of depositing a coherent solid layer of silicon nitride deposited upon a surface of a substrate by establishing an electrodeless glow discharge adjacent to said surface in an atmosphere containing a gaseous hydride of silicon and a gaseous hydride of nitrogen.

This invention relates to methods of depositing coherent solid layers of material upon a surface of a substrate.

The invention consists in a method of depositing upon a surface of a substrate a coherent solid layer of a material comprising an element or an inorganic compound, by establishing a plasma adjacent to the said surface in an atmosphere containing as gaseous compounds the element or elements comprising the material.

Plasma is defined as a state within a gas in which equal numbers of oppositely charged particles are to be found.

The plasma may be established by a variety of methods, but it is preferred to apply an electric field to establish the plasma, utilising a voltage which alternates at a radio frequency.

The surface on which the layer is deposited may be unheated and continuous coherent layers are obtained which are glassy and/or amorphous in form.

However, in some cases it is advantageous or desirable to heat the surface in order to improve the bonding within the layer, to obtain a particular crystalline form within the layer, or to prevent water or OH groups being included in the layer, for instance, in a deposited silica film.

The surface may be cooled in order to obtain a particular crystalline or amorphous form in the layer.

The production of a deposited layer from the gas phase on to a surface by the use of high temperatures, 500° to 1200° C., of the surface to supply thermally the energy required to form the material of the layers is known.

In the present invention where a surface is heated, the temperature of the surface on which deposition occurs is either insufficient to contribute any significant thermal energy to initiate the gas phase deposition of the layer, or is such as to produce a deposited layer which is not of the same physical structure as that obtained by the gas plasma initiation.

Organic or inorganic compounds may be used as the starting materials for obtaining the deposited layer, but it is preferred to use inorganic compounds particularly where very high purity is required in the deposited layer, due to the possibility of organic radicals or even carbon being included in the layer.

The deposition may be carried out at any pressure, providing other parameters, such as voltage frequency are adjusted accordingly, but it is preferred to carry out the deposition at a pressure below normal atmospheric pressure, for example in the range of 0.1 to 1 torr.

An application of the present invention is to obtain particular layer qualities for thin film and solid state devices with the least possible application of heat, and enables comparable or better results to be obtained than with the high temperature chemical processes.

Another application is to utilise properties of certain of the layers, such as high scratch resistance and impermeability, in the formation of protective coatings on a wide range of items, to be described later in the specification.

Embodiments of the invention will now be described with reference to the accompanying drawings, in which.

Figures 1, 2:
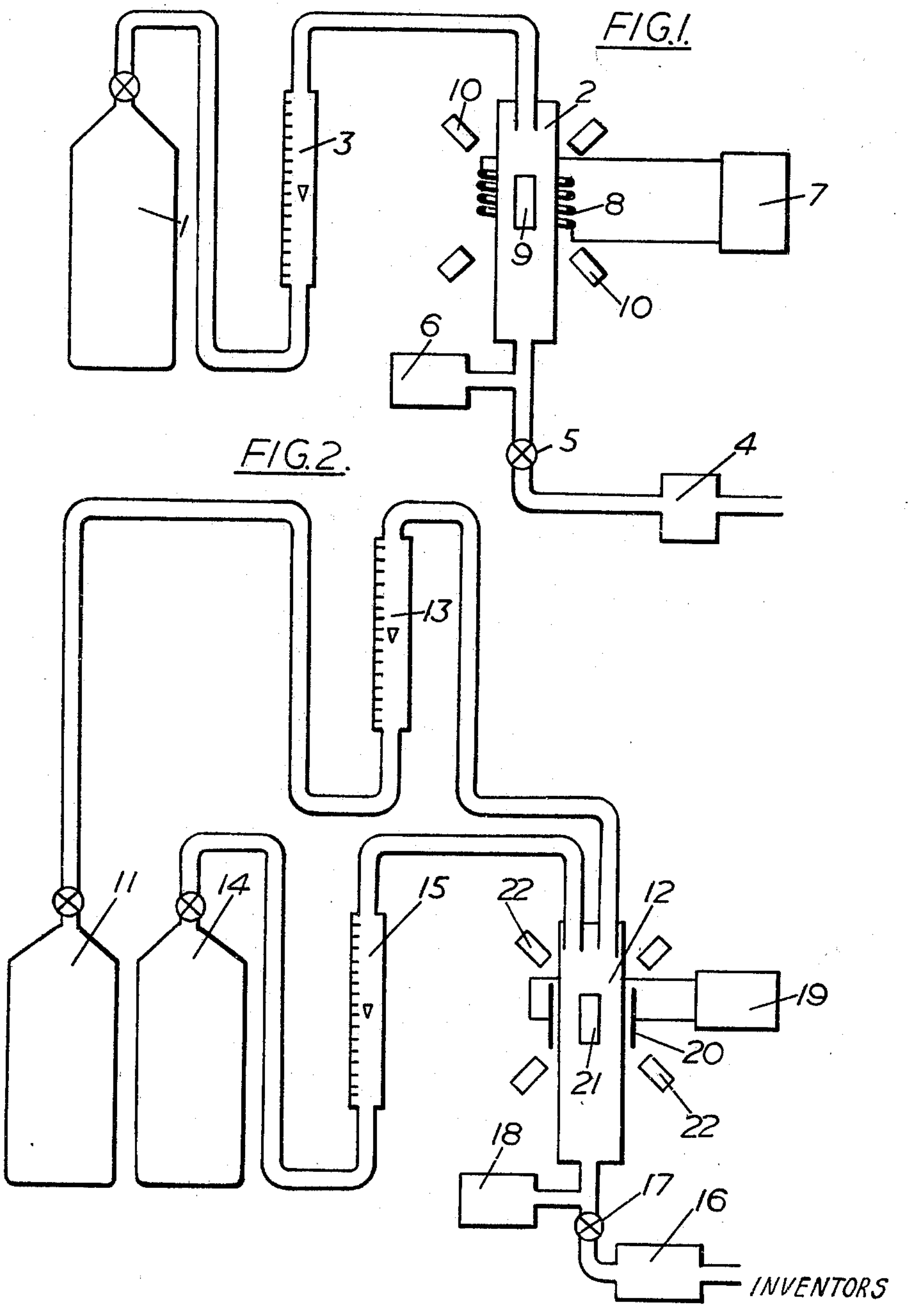
FIG. 1 shows apparatus for producing silicon and other layers.
FIG. 2 shows apparatus for producing silica and other layers.

Referring now to FIG. 1, a storage cylinder 1 is connected to a reaction chamber 2 of dielectric material via a flowmeter 3. The chamber 2 is evacuated by a vacuum pump 4, and a pressure regulator 5 and manometer 6 are provided to control the chamber pressure. A high impedance R.F. powersource is connected to a coil 8 surrounding the chamber 2 in which is positioned a substrate 9 on which the layer is to be deposited.

The substrate 9 may be selected from a wide range of materials, for example, a glass microscope slide, a strip or sheet of plastic film, a liquid mercury surface, an optical element such as a lens or prism, the surface of a semiconductor device, a metal plate or body such as molybdenum, a polished silicon slice, or a plastic body.

The substrate 9 may be unheated, in which case it will be at the ambient temperature, e.g. 18° C., or maintained at either a lower or an elevated temperature, the elevated temperature being consistent with the nature of the substrate material, and below the temperature which is necessary to effect any significant thermal dissociation of the contents of the cylinder 1. The temperature of the substrate determines the physical nature of the deposited layer, e.g. whether the layer is amorphous or crystalline in form.

On cold substrates, newly arrived atoms are frozen and cannot move appreciably. The possibility then exists of the deposition of materials in a metastable form by this "vapour-quenching" process. This can be compared with the co-evaporation of alloy components in vacuum to prepare alloys in a form which violates the equilibrium phase diagram.

The cylinder 1 or other appropriate container or source contains a chemical compound of the material to form the deposited layer. This chemical compound is either a gas, or a volatile solid which has a suitable vapour pressure to be in vapour form at the method operating pressure, which is generally but not necessarily at a reduced pressure. The vapour of the solid may be carried in to the reaction chamber by a suitable carrier gas.

When the deposited layer is to consist of a single chemical element such as silicon, molybdenum, tin or germanium, the chemical compound used as the starting material is typically a hydride of the element. When the deposited layer is to consist of a chemical compound such as silicon carbide, the starting material is a different chemical compound containing all the constituent elements required to form the deposited layer compound. For a silicon carbide layer, a suitable starting material is methyl silane.

Energisation of the coil 8 produces a plasma in the low pressure gas in the chamber 2, and the energy necessary to initiate the chemical reaction to dissociate the starting compound is obtained from the electric field set up by the coil 8. The plasma is initiated by a capacitive effect between the coil 8 and an earth formed for example by metal of the equipment frame and chamber supporting base. Once initiated, inductive energisation also occurs. The interposition of a Faraday screen stops the reaction.

Control of the plasma is effected by a magnetic field set up by magnets 10, which may be permanent magnets or electromagnets. The magnetic field may be such as to concentrate the deposition in a particular area, or to cause the deposition to be evenly spread over the substrate.

The plasma can exhibit a characteristic glow discharge, but under some conditions of operation best deposition conditions may be obtained when no glow is visible to the naked eye even in the dark. Some "effect" is known to be present, however, because deposition only occurs when the R.F. source is energised.

Using the apparatus shown in FIG. 1, with a power source 7 of 1 kilowatt and a source voltage selected from the range of 2 to 5 kilovolts layers are deposited as detailed in the examples now given.

EXAMPLE 1

Layer material silicon. Using pure silane in the cylinder 1 as the starting material, the system pressure is reduced to 0.2 torr and the silane flow rate adjusted to 2 ml./min. through the reaction chamber which is a fused quartz tube of 1 inch diameter. With a supply frequency of 0.5 mc./sec., silicon is deposited as a coherent amorphous layer on to an unheated substrate 9 at a rate of 3 microns/hour.

EXAMPLE 2

Layer material silicon. Using silane in the cylinder 1 as the starting material, the system pressure is reduced to 0.3 torr, and the silane flow rate adjusted to 4.5 ml./min. through the reaction chamber which is a glass bell jar of 3 inches diameter sealed to a metal base. With a supply frequency of 4 mc./sec., silicon is deposited as a coherent amorphous layer on to an unheated substrate at a rate of 3 microns/hour.

Layers of silicon prepared in the way described in the above two examples exhibit normal interference colours when thin. As growth progresses the layer darkens until transparency ceases and after further deposition the layer assumes the metallic lustre associated with massive silicon. Adherence and bonding to the substrate are excellent.

The silicon layer when laid down on an unheated substrate is amorphous or vitreous in form and is highly insulating, having a resistivity comparable with pure silica, and it follows that an application for this layer is to utilise its insulating properties. Other applications are for surface passivation, filters, and for surface protection. In these latter applications the substrate may be at a lowered or an elevated temperature in order to determine the physical nature of the silicon layer.

In the epitaxial deposition of silicon by conventional thermal deposition methods, there is a lower temperature limit, about 850° C., at which epitaxial (single crystal) growth no longer occurs. However, by combining the plasma deposition method with the thermal deposition method, the lower temperature limit set in the thermal method can be reduced, to about 650° C. which is the substrate temperature, with the extra energy required being available from the plasma to effect the necessary physical and chemical changes.

EXAMPLE 3

Layer material molybdenum. Using molybdenum carbonyl, which is a solid, as the starting material in a glass container maintained at 25° C., when the vapour pressure of molybdenum carbonyl is 0.1 torr, hydrogen carrier gas is flowed over the molybdenum carbonyl and through the system at a rate such as to bring the system pressure to 8 torr. The reaction chamber is a glass Petrie dish sealed upside down onto a metal base provided with inlet and outlet to the enclosed volume within the dish. A spirally wound conductor or a solid circular plate on the top of the dish, and the metal base, form the input means for the supply at a frequency of 4 mc./sec. Molybdenum is deposited on the inner upper surface of the dish.

For the preparation of a deposited germanium layer, the starting compound is a hydride of germanium (germane), and for the preparation of a deposited tin layer, the starting compound is a hydride of tin (stannane). System pressures, flow rates and supply frequency are of the same order as those already given.

The germanium layer may be laid down on an unheated substrate, or on to a substrate at a lower or an elevated temperature (up to 400° C.) and applications of the layers so produced are as for the silicon layers.

The tin layer may be laid down on an unheated substrate, or on to a substrate at a lower or an elevated temperature (above 150° C. some thermal decomposition will take place). Typical applications for the tin layers are for contacts, conducting paths, micro-circuit manufacture.

Metal layers from an organo-metal compound, as typified by the deposition of molybdenum from molybdenum carbonyl, may be formed for example as decorative, printed circuit or contact layers.

A further material which may be deposited by the plasma method is silicon carbide from a starting compound of methyl silane. Another material is selenium from a starting compound of a hydride of selenium ($H_2Se$), and yet another material is tellurium from a hydride of tellurium ($H_2Te$).

Referring now to FIG. 2, a first storage cylinder 11 is connected to a reaction chamber 12 of dielectric material via a flowmeter 13, and a second storage cylinder 14 is connected to the chamber 12 via a flowmeter 15. The chamber 12 is evacuated by a vacuum pump 16, and a pressure regulator 17 and manometer 18 are provided to control the chamber pressure. A high impedance R.F. power source 19 is connected to plates 20, which may be of aluminium foil bonded to the outside of the chamber walls, or a capacitive input may be provided by a cylindrical metal mesh around the chamber forming one input, the other input being formed by the metal base of the equipment. Inside the chamber is a substrate 21 on which the layer is to be deposited. Magnets 22 are provided for the establishment of a plasma controlling field.

The cylinder 11, or other suitable container or source, contains a chemical compound of one of the elements to form the deposited layer, and the cylinder 14 contains a chemical compound of the other of the elements to form the deposited layer. Each chemical compound is either a gas or a volatile solid having a suitable vapour pressure to be in vapour form at the method operating pressure, which is generally but not necessarily at a reduced pressure. The vapour of the solid may be carried into the reaction chamber by a suitable carrier gas.

The substrate 21 may be selected from a wide range of materials, such as already listed in that part of the description relating to FIG. 1.

Using the apparatus shown in FIG. 2 with a power source of 1 kilowatt, layers are deposited as detailed in the examples now given.

EXAMPLE 1

Layer material silica (silicon dioxide). Using pure silane in cylinder 11 and pure nitrous oxide in cylinder 14, the system pressure is reduced to 0.4 torr, and the gas flow rates adjusted to 1 ml./min. for the silane and 3 ml./min. for the nitrous oxide. The reaction chamber is a 1 inch diameter fused quartz tube, and with a supply frequency of 0.5 mc./sec., silica is deposited at a rate of 4 microns/hour.

The substrate 21 may be unheated, or at an elevated temperature, e.g. 200 or 350° C., to ensure that water is excluded from the deposited silica layer. As an alternative to nitrous oxide, either carbon dioxide or water vapour may be used to provide the source of oxygen.

The silica is deposited in a well-bonded glassy form and is highly scratch resistant and hard. Typical applications of the silica layers are for surface passivation, surface protection, in particular surface protection of optical elements such as lenses or prisms of glass or other materials, and for special glasses.

EXAMPLE 2

Layer material silicon nitride. Pure silane in cylinder 11, anhydrous ammonia (hydride of nitrogen) in cylinder 14, reaction chamber at 1 inch diameter fused quartz tube, silane flow rate 0.25 ml./min. ammonia flow rate 0.75 ml./min. system pressure 0.3 torr, supply frequency 1 mc./sec. substrate temperature 300° C., deposition rate 1 micron/hour.

EXAMPLE 3

Layer material silicon nitride. Pure silane in cylinder 11, anhydrous ammonia in cylinder 14, reaction chamber a 3 inch diameter glass bell jar sealed to a metal base, silane flow rate 4.5 ml./min. ammonia flow rate 12 ml./min. system pressure 0.3 torr substrate temperature 200° C., supply frequency 4 mc./sec., deposition rate 3 microns/hour.

Silicon nitride layers laid down as described in the above two examples and subsequently heat-treated at temperatures of 700° to 900° C., or laid down at these temperatures, become extremely chemically resistant. The silicon nitride layers have been found to be extremely hard, scratch and acid resistant when deposited at 300° C. or more, and therefore have great potential in the field of surface protection. The properties of the layers have been investigated both chemically and physically.

The dielectric constant of such a layer is between 7.0 and 10.0. The dielectric strength of 1 micron thick layers is in excess of $5\times10^6$ volts per cm.

Thus silicon nitride layers obtained by this method are eminently suitable for use as the dielectric material in capacitors. The capacitor contacts are applied by evaporation of metal or other known processes.

The refractive index of the silicon nitride (n) is 2.1 by ellipsometer measurements.

The silicon nitride ($Si_3N_4$) layers formed by the plasma method at room temperatures (of the substrate) suffer some chemical attack by $HF/HNO_3$ mixtures, but become extremely chemically resistant to all alkali and acid etches including $HF/HNO_3$ mixture when laid down, or subsequently raised to, the elevated temperatures. The layers are also impermeable to gas and water vapour.

The silicon nitride is formed by the radio frequency discharge reaction of a mixture of silane and ammonia, i.e. silicon hydride and nitrogen hydride. These gases normally show no thermally induced deposition of silicon nitride up to temperatures of 1000° C., and previous attempts at preparing layers of silicon nitride seem to have been unsuccessful.

The silicon nitride layers have application in providing a protective surface coating on a body or articles of a relatively soft and/or readily damaged material.

One catageory of such articles is to be found in plastic ware, for example in the large range of plastic domestic items on which it would be advantageous to provide a thin protective strongly adherent coating.

Another catageory of such articles is to be found in semiconductor devices such as transistors where surface protection is required.

On the surface of optical elements the silicon nitride layers can be used for protective or blooming purposes.

Set out in the list below are examples of further layers which may be deposited by the apparatus of FIG. 2, with gas flow rates, system pressure and source frequency being similar to those already given.

| Layer material | Starting materials |
|---|---|
| Silicon monoxide | Silane plus nitrous oxide or carbon dioxide ($N_2O$ or $CO_2$ flow rate adjusted for correct stoichiometry of SiO). |
| Silicon carbide | Silane plus methane or ethylene, etc. |
| Silicon sulphide | Silane plus hydrogen sulphide. |
| Germanium nitride | Germane plus ammonia. |
| Boron nitride | Diborane or decaborane plus ammonia. |
| Gallium nitride | Digallane plus ammonia. |
| Gallium arsenide | Digallane plus arsine. |
| Alluminium oxide | Aluminium trimethyl or alluminium ethoxide plus nitrous oxide or water vapour. Alternative preparation as for the four oxides below. |
| Tantalum oxide, Titanium oxide, Zirconium oxide, Niobium oxide | A volatile halide of the metal, such as titanium tetrachloride plus water vapour or nitrous oxide. |

Where deposited layers are to be formed of three chemical elements, the apparatus to be used will be similar to that shown in FIGS. 1 and 2, except that there will be three separate cylinders or other containers for the respective starting compounds each containing one of the required elements of the layer.

Examples of such three element layers are silicon oxynitride (for example $Si_2N_2O$) from silane + a hydride of nitrogen + carbon dioxide, and borosilicate glass from diborane + silane + nitrous oxide.

Typical applications for the layers of borosilicate glass include the formation of insulating layers on metallic surfaces, for example in micro-circuit manufacture, use as capacitor dielectric material, and surface protection of semiconductor devices.

Although in all of the above described layer preparations, a radio frequency source is specified, i.e., the frequency is above 10 kilocycles/sec., frequencies as low as 50 cycles/sec. have been used, and in theory it should be possible to go right down to zero frequency, i.e., D.C. At the lower frequencies such as 50 cycles/sec., electrodes in contact with the gaseous atmosphere have to be used to couple in the electric field to establish the plasma.

The applied voltage, frequency, system pressure and gas flow rates are all inter-dependent, but may be varied over a wide range consistent with the basic requirement of establishing the plasma. Thus for a higher pressure, the voltage and/or frequency will have to be raised. Conversely for lower pressures the voltage and/or frequency may be reduced.

Selective deposition of any of the layers may be obtained by the use of suitable "in-contact" masks. Although the gaseous atmosphere may tend to creep between the underside of the mask and the substrate surface, no deposition occurs under the mask. It is believed that metal masks have the effect of locally inhibiting the action of the plasma and thus preventing deposition under the mask.

It is to be understood that the foregoing description of specific examples of this invention is not to be considered as a limitation of its scope.

What we claim is:

1. A method of directly depositing an electrically insulating amorphous coherent solid layer of silicon nitride upon a surface of a substrate from a gaseous atmosphere comprising a mixture of a hydride of nitrogen and a hydride of silicon, said substrate being maintained during said deposition at a temperature not exceeding 950° C., said temperature being below the temperature necessary to thermally induce deposition of silicon nitride on said substrate, the activating energy for said deposition being supplied by establishing an electrodeless glow discharge adjacent to said surface, said layer being deposited on said surface from said discharge.

2. A method as claimed in claim 1 in which the substrate surface is unheated.

3. A method as claimed in claim 1 wherein said deposited layer of silicon nitride is deposited at a temperature less than 300° C. and further comprising the step of subsequently heat treating said layer at a temperature of about 700° C. to 900° C. so as to obtain a chemically and scratch resistant layer.

4. A method as claimed in claim 3, in which silane and anhydrous ammonia are flowed through a reaction chamber formed by a 1 inch diameter dielectric tube at a rate of 0.25 ml./min. and 0.75 ml./min. respectively and at a pressure of 0.4 torr, and in which the plasma is established by an electric field applied by a voltage alternating at a frequency of 1 megacycle per second.

5. A method as claimed in claim 3 in which silane and anhydrous ammonia are flowed through a reaction chamber formed by a 3 inch diameter dielectric tube at a rate of 4.5 ml./min. and 12 ml./min. respectively and at a pressure of 0.3 torr, and in which the plasma is established by an electric field applied by a voltage alternating at a frequency of 4 megacycles per second.

6. A method as claimed in claim 1 wherein said discharge is initiated by exciting said gaseous atmosphere with an applied electric field, said electric field being applied by an alternating voltage at an R.F. frequency.

7. A method as claimed in claim 1 wherein said discharge is initiated by exciting said gaseous atmosphere with an applied electric field, said electric field being applied by a capacitance means.

References Cited

UNITED STATES PATENTS

| | | | |
|---|---|---|---|
| 3,049,488 | 8/1962 | Jackson et al. | 204—312 |
| 3,108,900 | 10/1963 | Papp | 117—93.1 |
| 2,960,594 | 11/1960 | Thorpe | 219—75 |
| 3,246,114 | 4/1966 | Matvay | 219—76 |
| 3,275,408 | 9/1966 | Winterburn | 117—93.1 |

FOREIGN PATENTS

| | | |
|---|---|---|
| 657,903 | 3/1938 | Germany. |

OTHER REFERENCES

Kevern: "Product Eng.," Oct. 10, 1966, pp. 67–74.

WILLIAM L. JARVIS, Primary Examiner

U.S. Cl. X.R.

117—201, 93.1, 106; 204—192, 312